(12) United States Patent
Kameyama et al.

(10) Patent No.: US 12,130,640 B2
(45) Date of Patent: Oct. 29, 2024

(54) FLYING OBJECT CONTROL APPARATUS

(71) Applicant: NTT DOCOMO, INC., Tokyo (JP)

(72) Inventors: Naoki Kameyama, Tokyo (JP); Tomoe Ushiro, Tokyo (JP); Youhei Oono, Tokyo (JP); Yuichiro Segawa, Tokyo (JP)

(*) Notice: Subject to any disclaimer, the term of this patent is extended or adjusted under 35 U.S.C. 154(b) by 975 days.

(21) Appl. No.: 16/973,205

(22) PCT Filed: Jun. 26, 2019

(86) PCT No.: PCT/JP2019/025328
§ 371 (c)(1),
(2) Date: Dec. 8, 2020

(87) PCT Pub. No.: WO2020/004448
PCT Pub. Date: Jan. 2, 2020

(65) Prior Publication Data
US 2021/0191429 A1    Jun. 24, 2021

(30) Foreign Application Priority Data

Jun. 26, 2018 (JP) .................. 2018-120797

(51) Int. Cl.
*G05D 1/00* (2006.01)
*G08G 5/04* (2006.01)
(Continued)

(52) U.S. Cl.
CPC ............ *G05D 1/106* (2019.05); *G08G 5/04* (2013.01); *B64U 10/13* (2023.01); *B64U 50/19* (2023.01);
(Continued)

(58) Field of Classification Search
CPC ...... G05D 1/106; G08G 5/04; B64U 2201/00; B64U 10/13; B64C 39/024; G01S 19/13
See application file for complete search history.

(56) References Cited

U.S. PATENT DOCUMENTS

2017/0010615 A1  1/2017 Tanaka et al.
2017/0292841 A1  10/2017 Sabe et al.
(Continued)

FOREIGN PATENT DOCUMENTS

WO  2015163106 A1  10/2015
WO  2016059930 A1  4/2016
WO  2018078859 A1  5/2018

OTHER PUBLICATIONS

International Search Report issued in corresponding PCT Application No. PCT/JP2019/025328 dated Sep. 17, 2019, 4 pages.
(Continued)

*Primary Examiner* — Aryan E Weisenfeld
(74) *Attorney, Agent, or Firm* — DILWORTH IP, LLC (57) ABSTRACT

The present invention aims to control position of flying object with respect to a structural object in a situation where it is difficult to perform positioning based on radio signals transmitted from a satellite. A position identification unit identifies position of flying object in troublesome GPS signal reception space, using different methods for coordinate axes. Specifically, position identification unit identifies position, on Z axis (first coordinate axis), of flying object in troublesome GPS signal reception space, based on distance from flying object to structural object (distance measured at time of position identification), and identifies positions, on X and Y axes (second coordinate axes), of flying object based on change in shape of structural object in respective axis directions of X and Y axes (second coordinate axes) (history of distance from flying object to bridge B measured multiple times until position identification).

6 Claims, 6 Drawing Sheets

(51) Int. Cl.
*B64U 10/13* (2023.01)
*B64U 50/19* (2023.01)
*B64U 101/30* (2023.01)
*G01S 19/13* (2010.01)

(52) U.S. Cl.
CPC ...... *B64U 2101/30* (2023.01); *B64U 2201/00* (2023.01); *B64U 2201/104* (2023.01); *G01S 19/13* (2013.01)

(56) References Cited

U.S. PATENT DOCUMENTS

2019/0302770 A1   10/2019  Tanaka et al.
2019/0317502 A1*  10/2019  Guo ........................ G05D 1/12

OTHER PUBLICATIONS

Notice of Reasons for Refusal issued in corresponding Japanese Patent Application No. 2020-527569, dated Sep. 13, 2022.

* cited by examiner

FLYING OBJECT CONTROL APPARATUS

TECHNICAL FIELD

The present invention relates to a technique for specifying the position of a flying object.

BACKGROUND

As one utilization form of unmanned flying objects, that is, so-called drones, a system has been proposed in which a drone equipped with a camera flies along a surface of a structural object such as a tall structure or a bridge and captures an image of the surface of the structural object, and an operator checks the state of damage, degradation, and the like of the structural object. Typically, position identification of a drone is performed based on radio signals (referred to as GPS signals) transmitted from a plurality of Global Positioning System (GPS) satellites, and, in an area under a bridge for example, the environment for receiving the GPS signals is poor, and position identification of the drone is difficult. In this case, it is difficult to identify which part of the structural object was captured by the drone. For example, WO 15/163106A discloses that a marker for position estimation and a transmitter for transmitting a GPS signal are provided in an area under the bridge where GPS signals are hard to receive, and are used to accurately identify the current position of a drone.

SUMMARY OF INVENTION

In view of such circumstances, an object of the present invention is to control the position of a flying object with respect to a structural object in a situation where it is difficult to perform positioning based on radio signals transmitted from satellites.

To solve the above-described problems, the present invention provides a flying object control apparatus that includes: a setting unit configured to set a plurality of coordinate axes, the plurality of coordinate axes serving as a reference for identifying a position of a flying object, in a flight space that includes a space in which accuracy of positioning based on a radio signal transmitted from a satellite is equal to or smaller than a threshold; a position identification unit configured to identify the position of the flying object in the space, using different methods for the plurality of coordinate axes; and a flight control unit configured to control flight of the flying object based on the position identified by the position identification unit.

Preferably, the plurality of coordinate axes includes a first coordinate axis that intersects with a structural object, and a second coordinate axis that does not intersect with the structural object, and the position identification unit continuously identifies a position, on the first coordinate axis, of the flying object, whereas the position identification unit identifies a position, on the second coordinate axis, of the flying object at a frequency smaller than a frequency at which the position on the first coordinate axis is identified, or does not identify the position, on the second coordinate axis, of the flying object.

Preferably, the flight control unit controls, at a point in time when at least one position, on the second coordinate axis, of the flying object is identified by the position identification unit, flight of the flying object in an axis direction of the second coordinate axis based on the at least one position, whereas the flight control unit controls, in a period in which no position, on the second coordinate axis, of the flying object is identified by the position identification unit, flight of the flying object in the axis direction of the second coordinate axis based on a position of the at least one position, on the second coordinate axis, of the flying object identified immediately before the start of the period.

Preferably, the position identification unit identifies, the position, on the first coordinate axis, of the flying object based on a distance from the flying object to the structural object.

Preferably, the position identification unit identifies, the position, on the second coordinate axis, of the flying object based on a change in a shape of the structural object in the axis direction of the second coordinate axis.

Preferably, the flying object control apparatus further includes a position correction unit configured to correct, based on the position, on a coordinate axis of the plurality of coordinate axes, of the flying object that is identified by the position identification unit, another position, on the coordinate axis, of the flying object that has been identified during a period up to the identification of the position.

Preferably, an upper limit set for the period in which the flight control unit controls flight of the flying object based on the position identified immediately before the start of the period differs between the coordinate axes included in the plurality of coordinate axes.

According to the present invention, it is possible to control the position of a flying object with respect to a structural object in a situation where it is difficult to perform positioning based on radio signals transmitted from satellites.

DETAILED DESCRIPTION OF EMBODIMENT

Configuration

Figure 1:
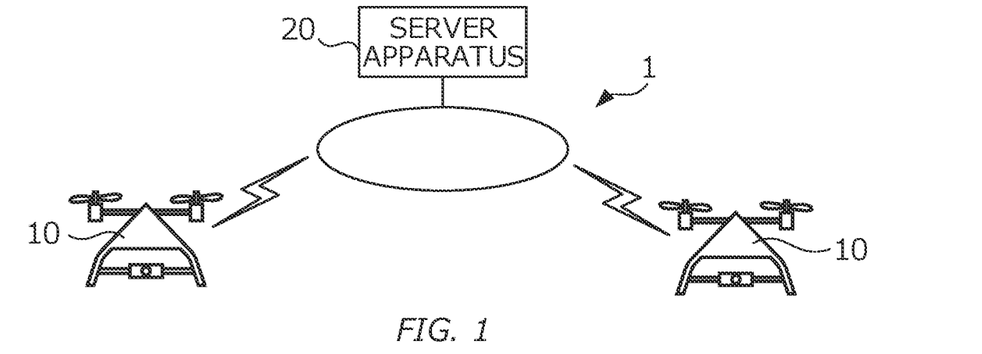
FIG. 1 is a diagram showing an example of a configuration of flight control system 1, in accordance to the present invention.

FIG. 1 is a diagram showing an example of a configuration of flight control system 1. Flight control system 1 includes one or more flying objects 10, and server apparatus 20. Flying object 10 and server apparatus 20 can communicate with each other via a network. Flying object 10 performs processing (hereinafter, image capture processing) for capturing an image of a structural object such as a bridge for example, and storing image data indicating the captured image in association with the position of flying object 10 and the date of the image capture. In the present embodiment, flying object 10 functions as a flying object control apparatus that controls flight of flying object 10 itself.

Server apparatus 20 is a computer that includes a processor and a memory. Server apparatus 20 stores a flight schedule and a flight record of flying object 10. The flight schedule and the flight record include identification information of flying object 10 and the flight condition of flying object 10. The flight condition of the flight schedule includes locations to which flying object 10 is scheduled to fly, and the date on which flying object 10 is scheduled to arrive at each of the locations. The flight condition of the flight record includes locations to which flying object 10 has actually flown in accordance with the flight schedule of flying object 10, and the date on which flying object 10 arrived at each of the locations. Server apparatus 20 notifies flying object 10 of a flight schedule, and flying object 10 flies in accordance with this flight schedule. Server apparatus 20 stores, as flight history, identification information, a location, and date given by flying object 10. Server apparatus 20 determines whether or not the location and the date are within a range of the flight schedule predetermined for flying object 10 having the identification information, and stores the result of the determination.

Furthermore, the flight schedule includes three-dimensional shape data of a structural object to be subjected to processing (for example, image capture processing) that is performed according to flight of flying object 10. Shape data refers to data that indicates positions on surfaces of the structural object, using, for example, the latitude, the longitude, and the altitude of a given position on earth as a reference (reference position). For example, the shape data is an aggregation of X, Y, and Z coordinates indicating each of the positions of the surfaces of the structural object, using the above-described reference position as the original point of an XYZ coordinate space. Note that the reference position is preferably a position located in a space that is not a later-described troublesome GPS signal reception space, that is, in a space where radio signals transmitted from a plurality of GPS satellites can favorably be received.

Figure 2:
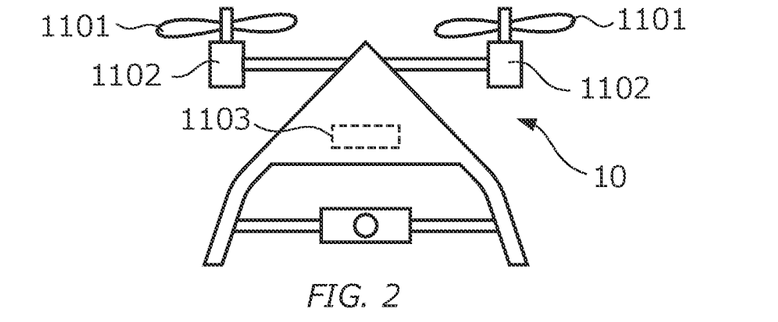
FIG. 2 is a diagram showing an example of the outer appearance of flying object 10, in accordance to the present invention.

FIG. 2 is a diagram showing an example of the outer appearance of flying object 10. Flying object 10 is, for example, a so-called drone, and is provided with propellers 1101, drive apparatuses 1102, and battery 1103.

Each propeller 1101 rotates about a shaft. When propellers 1101 are rotated, flying object 10 flies. Drive apparatuses 1102 supply power to propellers 1101 so that they rotate. Drive apparatuses 1102 include, for example, a motor, and a transmission mechanism for transmitting power from the motor to propellers 1101. Battery 1103 supplies electric power to the components of flying object 10 including drive apparatuses 1102.

Figure 3:
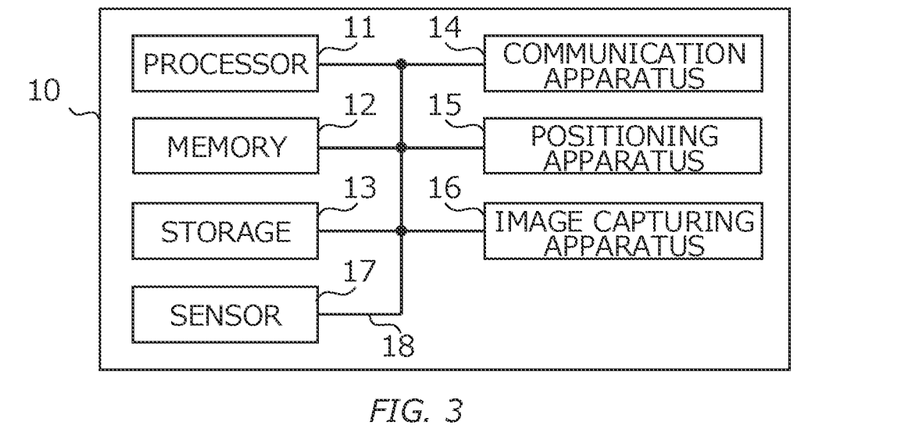
FIG. 3 is a diagram showing an electrical hardware configuration of flying object 10, in accordance to the present invention.

FIG. 3 is a diagram showing an electrical hardware configuration of flying object 10. Flying object 10 is physically configured as a computer device that includes processor 11, memory 12, storage 13, communication apparatus 14, positioning apparatus 15, image capturing apparatus 16, sensor 17, bus 18, and the like. Note that in the following description, the term "apparatus" may be read as a circuit, a device, a unit, or the like.

Processor 11 activates, for example, an operating system to control the entire computer. Processor 11 may also be constituted by a central processing unit (CPU) that includes an interface with peripheral apparatuses, a control apparatus, an arithmetic apparatus, a register, and the like.

Furthermore, processor 11 reads a program (program code), a software module, or data from storage 13 and/or communication apparatus 14 to memory 12, and executes various types of processing based thereon. As the program, a program for causing the computer to execute at least some of operations of flying object 10 is used. The various types of processing that are executed in flying object 10 may be executed by one processor 11, or may be executed by two or more processors 11 at the same time or successively. One or more chips may also be mounted on processor 11. Note that the program may also be transmitted from a network via a telecommunication line.

Memory 12 is a computer-readable recording medium, and may be constituted by at least one of, for example, a Read Only Memory (ROM), an Erasable Programmable ROM (EPROM), an Electrically Erasable Programmable ROM (EEPROM), a Random Access Memory (RAM), and the like. Memory 12 may also be referred to as a register, a cache, a main memory (main storage unit), or the like. Memory 12 can store a program (program code), a software module, and the like that can be executed to perform a flight control method according to an embodiment of the present invention.

Storage 13 is a computer-readable recording medium, and may be constituted by at least one of, for example, an optical disk such as a Compact Disc ROM (CD-ROM), a hard disc drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disc, a magnetic strip, and the like. Storage 13 may also be referred to as an auxiliary storage unit.

Communication apparatus 14 is a piece of hardware (a transmitting and receiving device) for performing communication with a computer via a wired network and/or a wireless network, and is also referred to as, for example, a network device, a network controller, a network card, a communication module, or the like.

Positioning apparatus 15 measures the position of flying object 10. Positioning apparatus 15 is, for example, a GPS receiver, and measures the current position of flying object 10 based on radio signals (GPS signals) received from a plurality of GPS satellites, for example.

Image capturing apparatus 16 captures an image of the surrounding area of flying object 10. Image capturing apparatus 16 is a camera for example, and performs image capturing using an optical system to form an image on an imaging element. The image capturing direction and the image capturing range in which image capturing apparatus 16 captures an image may be remotely controllable.

Sensor 17 transmits radio waves (for example, infrared waves) of a predetermined frequency, and receives reflected waves thereof. Processor 11 calculates, based on the time interval between the transmission and the reception of the radio waves and the speed of the radio waves, the distance from flying object 10 to a structural object serving as the reflector. In other words, sensor 17 and processor 11 function as means for measuring the distance from flying object 10 to a structural object.

The above-described apparatuses such as processor 11 and memory 12 are connected to each other via bus 18 for communicating information. Bus 18 may be constituted by a single bus, or may be constituted by buses that are different between the apparatuses.

Figure 4:
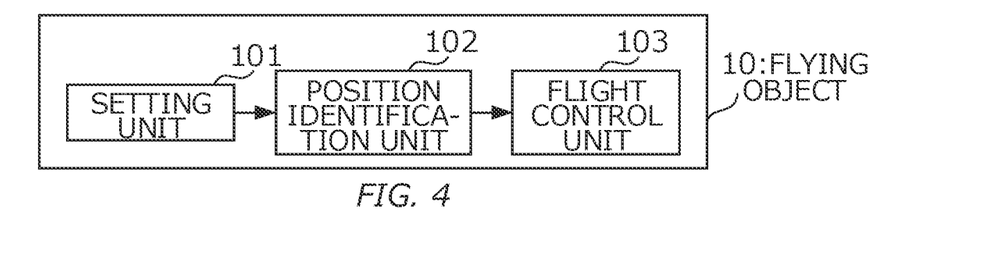
FIG. 4 is a diagram showing an example of a functional configuration of flying object 10, in accordance to the present invention.

FIG. 4 is a diagram showing an example of a functional configuration of flying object 10. In flying object 10, these functions are realized as a result of processor 11 reading a program or the like to memory 12 and executing the processing.

Setting unit 101 sets a plurality of coordinate axes, which serve as a reference for identifying the position of flying object 10, in a flight space that includes a space in which the accuracy of positioning based on GPS signals is equal to or smaller than a predetermined threshold (hereinafter, referred to as a troublesome GPS signal reception space). "Troublesome GPS signal reception space" is a space in which reception of GPS signals by positioning apparatus 15 is disturbed, such as a space under a bridge or a lower space of a group of a plurality of tall structures adjacent to each other, for example.

Figure 5:
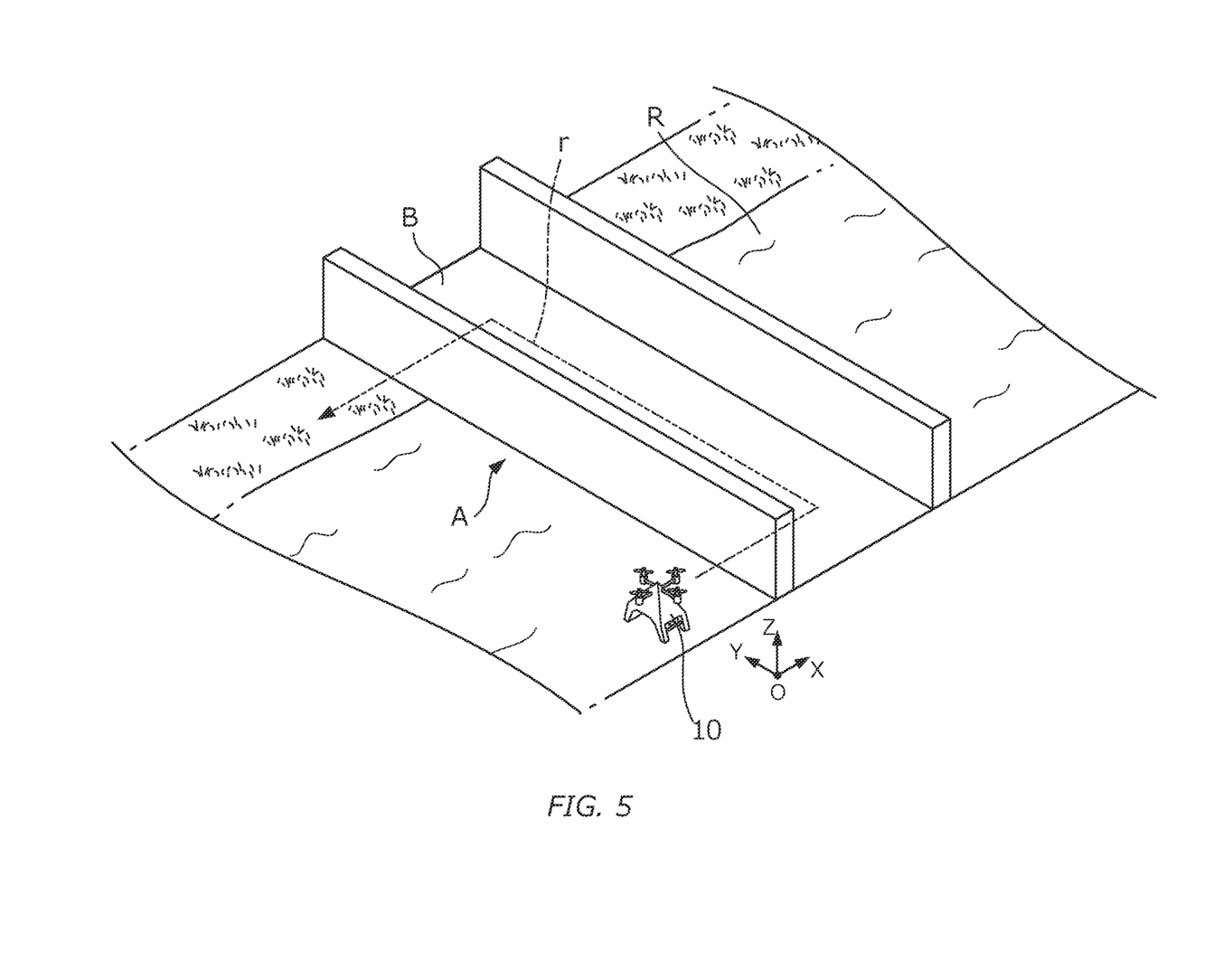
FIG. 5 is a perspective view showing an example of a relationship between a structural object and coordinate axes, in accordance to the present invention.

Here, FIG. 5 is a perspective view showing an example of a relationship between a structural object and coordinate axes. Here, the structural object is assumed to be bridge B that spans river R. In this example, space A that is located under bridge B and in which reception of GPS signals is disturbed by bridge B is the troublesome GPS signal reception space. Flying object 10 flies in a three-dimensional XYZ coordinate space in which a given reference position serves as original point O, the three-dimensional XYZ coordinate space serving as a flight space. This flight space includes troublesome GPS signal reception space A. Flying object 10 flies on flight path r that is predetermined in a flight schedule, based on the X, Y, and Z axes. This flight path r is a path passing below the bridge B, and flying object 10 performs image capture processing for capturing an image of the underside of bridge B while flying along flight path r. Of the X, Y, and Z axes, the Z axis, which is an axis in the vertical direction, is a first coordinate axis that intersects with bridge B. Also, the X and Y axes, which are orthogonal to each other in a horizontal plane, are second coordinate axes that do not intersect with bridge B. As indicated by a dashed line shown in the figure, flight path r is a flight path on which the flying object flies from a GPS signal receivable space in a direction parallel to the X axis direction (X-axis positive direction), enters troublesome GPS signal reception space A located near one of the ends of bridge B, then flies within troublesome GPS signal reception space A to a position near the other end of bridge B in a direction parallel to the Y axis direction (Y-axis positive direction), and then flies from troublesome GPS signal reception space A to the GPS signal receivable space in a direction parallel to the X axis direction (X-axis negative direction). The Z coordinate of flight path r has a constant value that corresponds to a location between the underside of bridge B and the water surface of river R. In other words, flight path r is a flight path that draws, for example, three sides of a rectangle on a horizontal plane.

Position identification unit 102 identifies the position of flying object 10 in the troublesome GPS signal reception space, using different methods for the respective coordinate axes. Specifically, position identification unit 102 identifies, in a troublesome GPS signal reception space, the position, on the Z axis (first coordinate axis), of flying object 10 based on the distance from flying object 10 to bridge B. This distance is a distance measured by sensor 17 when the position, on the Z axis, of flying object 10 is identified. Note that there may be cases where position identification unit 102 exceptionally identifies the position, on the Z axis (first coordinate axis), of flying object 10 based on the distance from flying object 10 to the water surface of river R, and details thereof will be described later. Also, position identification unit 102 identifies the position, on each of the X and Y axes (second coordinate axes), of flying object 10 based on a change in the shape of bridge B in the axis direction of the corresponding one of the X and Y axes. A change in the shape of bridge B in the axis directions of the X and Y axes corresponds to a change in the distance from flying object 10 to bridge B measured multiple times by sensor 17 until the positions, on the X and Y axes, of flying object 10 are identified.

Figure 6:
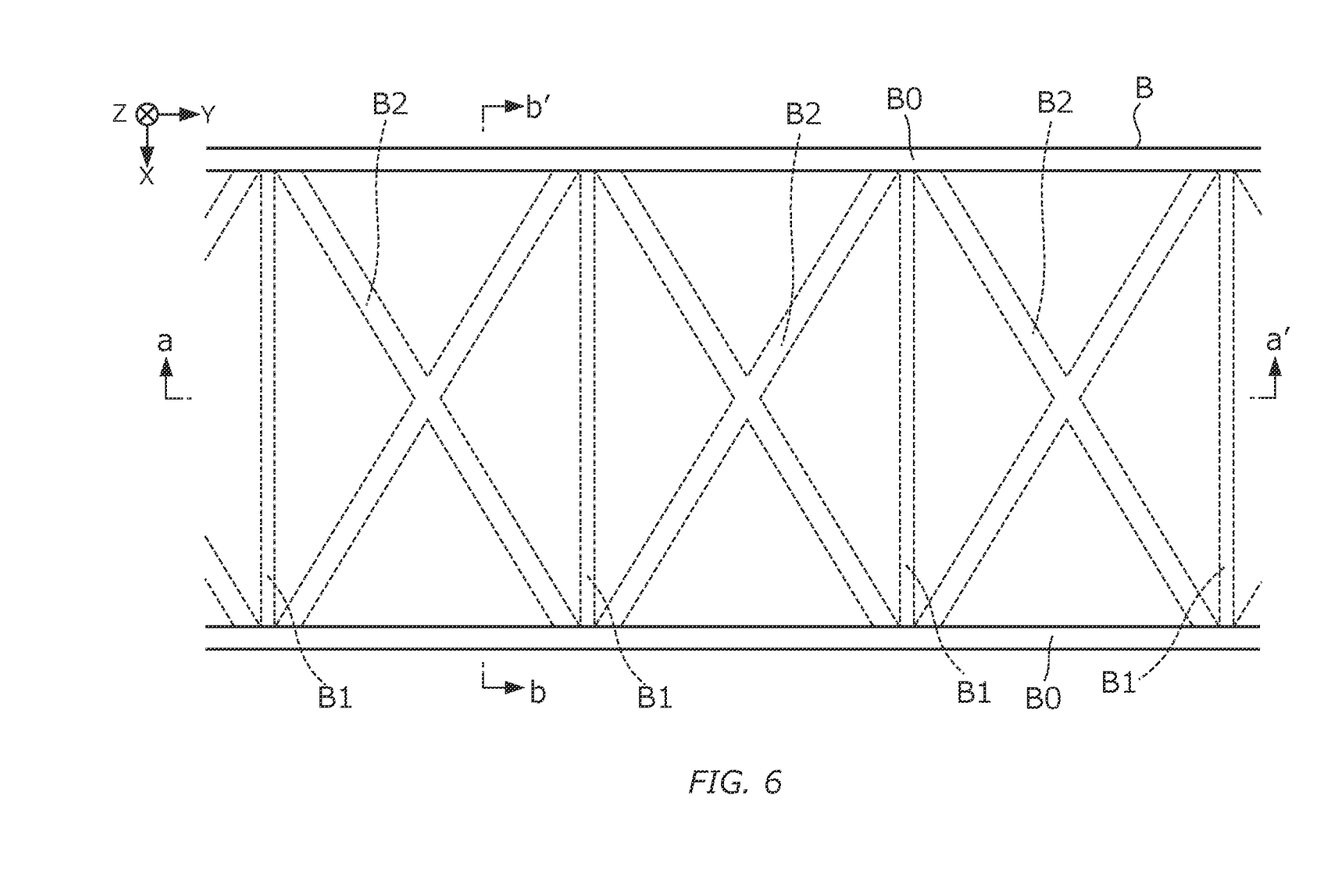
FIG. 6 is a plan view showing an example of a structure of the underside of the structural object, in accordance to the present invention.
Figure 7:
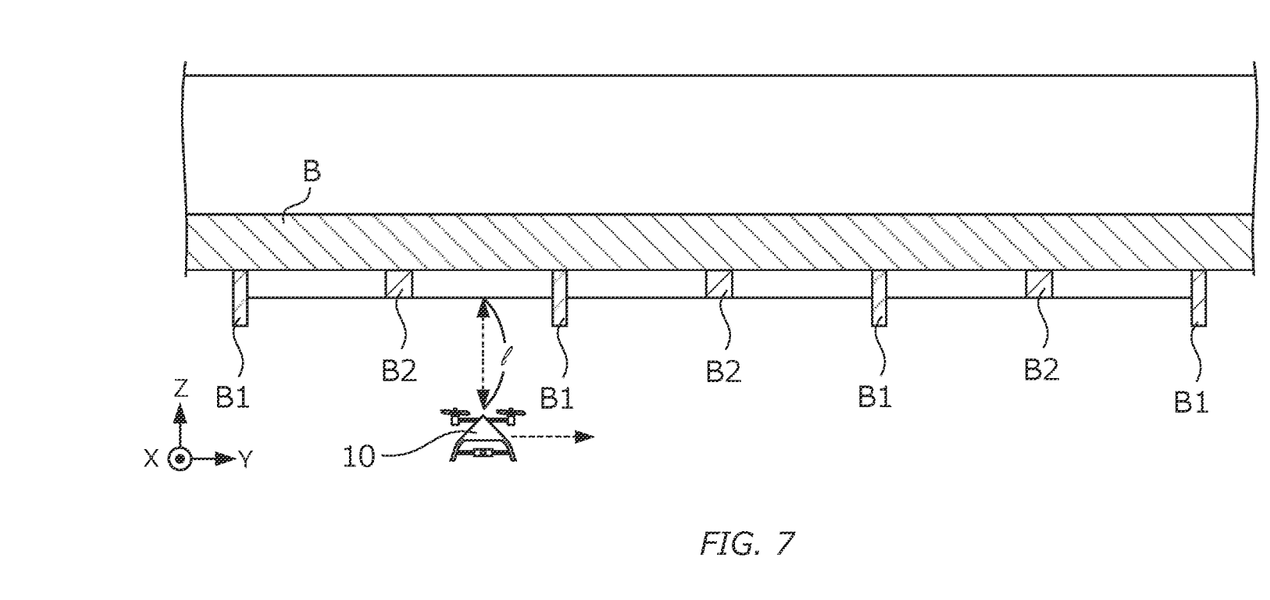
FIG. 7 is a diagram showing an example of the relationship between the structural object and the coordinate axes, when viewed in a direction parallel to the X axis, in accordance to the present invention.
Figure 8:
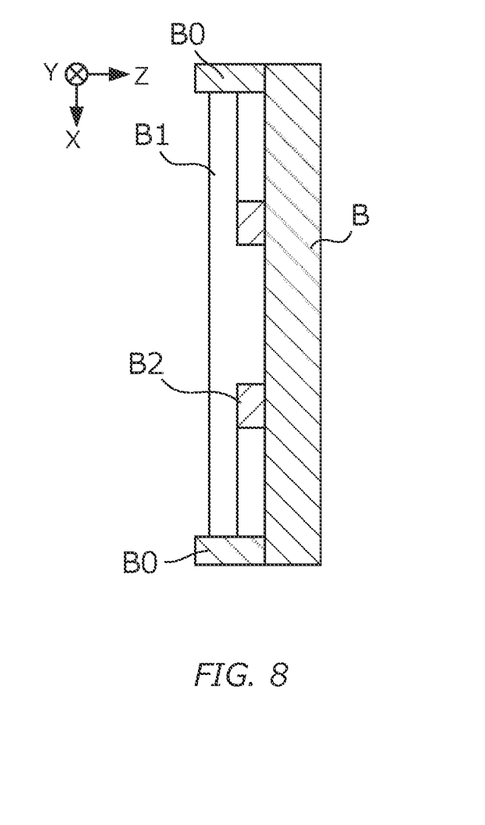
FIG. 8 is a diagram showing an example of the relationship between the structural object and the coordinate axes, when viewed in a direction parallel to the Y axis, in accordance to the present invention.

Here, FIG. 6 is a plan view showing an example of a structure of the underside of bridge B, when viewed upward from below bridge B. As shown in the figure, bridge B includes, on the underside thereof, a plurality of beam members B0 that extend in the Y axis direction along the lateral sides of bridge B, and a plurality of beam members B1 that extend in the X axis direction at predetermined intervals in the Y axis direction. Furthermore, a plurality of brace members B2 are provided that are interposed between the plurality of beam members B1. FIG. 7 is a cross-sectional view taken along a line a-a' of FIG. 6, showing an example of a relationship between the structural object and the coordinate axes when viewed in a direction parallel to the X axis. Furthermore, FIG. 8 is a cross-sectional view taken along a line b-b' of FIG. 6, showing an example of the relationship between the structural object and the coordinate axes when viewed in a direction parallel to the Y axis. As shown in FIGS. 7 and 8, these beam members B0, beam members B1, and brace members B2 all protrude downward from the underside of bridge B. The amounts of protrusion are different from each other between the beam members B0, the beam members B1, and the brace members B2.

The X, Y, and Z coordinate values indicating the shape of the underside of bridge B as shown in FIGS. 6 to 8 are stored in advance in server apparatus 20 as shape data of the structural object. Accordingly, position identification unit 102 can identify the position, on the Z axis, of flying object 10, based on the shape data and the distance from flying object 10 to the underside of bridge B that is located on the upper side in the vertical direction. Here, as described above, flight path r is a flight path on which flying object 10 flies from the GPS signal receivable space in a direction parallel to the X axis direction (X-axis positive direction), enters troublesome GPS signal reception space A located near one of the ends of bridge B, then flies within troublesome GPS signal reception space A to the position near the other end of bridge B in a direction parallel to the Y axis direction (Y-axis positive direction), and flies from troublesome GPS signal reception space A to the GPS signal receivable space in a direction parallel to the X axis direction (X-axis negative direction). In the GPS signal receivable space, the measured distance (distance measured by sensor 17) from flying object 10 to the underside of bridge B that is located on the upper side in the vertical direction thereof is infinite, and thus position identification unit 102 cannot identify the position, on the Z axis, of flying object 10 based on the measured distance, but can identify the position, on the Z axis, of flying object 10 based on GPS signals. Here, if the position (Z coordinate value) of the water surface of river R is known, position identification unit 102 may also identify the position, on the Z axis (first coordinate axis), of flying object 10 based on the measured distance (distance measured by sensor 17) from flying object 10 to the water surface of river R that is located on the lower side in the vertical direction. Also, the environment for receiving GPS signals degrades as flying object 10 moves toward the lower side of bridge B, but when flying object 10 arrives at the position on the lower and lateral side of bridge B, the distance from flying object 10 to the beam member B0 of bridge B that is located on the upper side in the vertical direction is measured. At this time, position identification unit 102 identifies the position, on the Z axis, of flying object 10 based on the known shape data of the beam member B0 and the measured distance. Flight control unit 103 controls the flight of flying object 10 by driving drive apparatuses 1102 so that the difference between the identified position on the Z axis and the position defined in the flight schedule approaches 0. In the case of the example, flight control unit 103 performs control such that the difference between the identified position and the position defined in the flight schedule approaches 0, and then drives drive apparatuses 1102 so that the position in the Z axis direction has a constant value, thereby flying object 10 flies horizontally.

Position identification unit 102 can identify the position, on the X axis, of flying object 10 based on a change in the shape of bridge B in the axis direction of the X axis in the thus recorded flight history (a change in the distance from flying object 10 to the underside of bridge B that is located on the upper side in the vertical direction). Specifically, since, in the GPS signal receivable space, the measured distance (distance measured by sensor 17) from flying object 10 to the underside of bridge B that is located on the upper side in the vertical direction is infinite and fixed, position identification unit 102 cannot identify the position, on the X axis, of flying object 10 based on a change in the measured distance, but can identify the position, on the X axis, of flying object 10 based on GPS signals. The environment for receiving GPS signals degrades as flying object 10 moves toward the lower side of bridge B along flight path r, but when flying object 10 arrives at the position on the lower and lateral side of bridge B, the distance from flying object 10 to the beam member B0 of bridge B that is located on the upper side in the vertical direction is measured. At this time, position identification unit 102 identifies the position, on the X axis, of flying object 10, based on the position, on the Z axis, of flying object 10 identified at this point in time, the known shape data of the beam member B0, and the measured distance. Flight control unit 103 controls the flight of flying object 10 by driving drive apparatuses 1102 so that the difference between the identified position on the X axis and the position defined in the flight schedule approaches 0. In the case of the example, flight control unit 103 performs control such that the difference between the identified position and the position defined in the flight schedule approaches 0, and flying object 10 flies in the X axis direction at a given speed.

Furthermore, position identification unit 102 can identify the position, on the Y axis, of flying object 10 based on a change in the shape of bridge B in the axis direction of the Y axis in the thus recorded flight history (a change in the distance from flying object 10 to the underside of bridge B that is located on the upper side in the vertical direction). Specifically, since, in the GPS signal receivable space, the measured distance (distance measured by sensor 17) from flying object 10 to the underside of bridge B that is located on the upper side in the vertical direction is infinite and fixed, position identification unit 102 cannot identify the position, on the Y axis, of flying object 10 based on a change in the measured distance, but can identify the position, on the Y axis, of flying object 10 based on GPS signals. The environment for receiving GPS signals degrades as flying object 10 moves toward the lower side of bridge B along flight path r, but when flying object 10 arrives at the position on the lower and lateral side of bridge B, the distance from flying object 10 to the beam member B0 of bridge B that is located on the upper side in the vertical direction is measured. At this time, as described above, position identification unit 102 can identify the position, on the X axis, of flying object 10, based on the position, on the Z axis, of flying object 10 identified at this point in time, the known shape data of the beam member B0, and the measured distance, but the shape of beam member B0 does not change in the Y axis direction, and thus even at this point in time, it is not possible to identify the position, on the Y axis, of flying object 10 based on a change in the measured distance. When flying object 10 further flies in the X axis direction from this state, then the distance from flying object 10 to brace member B2 of bridge B that is located on the upper side in the vertical direction is measured. At this time, position identification unit 102 can identify the position, on the Y axis, of flying object 10, based on the known shape data of beam member B0 and brace member B2, and temporal difference between the point in time at which the distance to beam member B0 was calculated, and the point in time at which the distance to brace member B2 was calculated, and the speed at which flying object 10 flew therebetween. Then, when flying object 10 changes the direction of flight and flies in the Y axis direction, the distance from flying object 10 to beam member B1 of bridge B that is located on the upper side in the vertical direction is measured. At this time, position identification unit 102 can identify the position, on the Y axis, of flying object 10 based on the position, on the Z axis, of flying object 10 identified at this point in time, the known shape data of beam member B1, and the measured distance.

Here, sensor 17 measures the distance from flying object 10 to the structural object, using a very short time period as a sampling period. In other words, position identification unit 102 will continuously identify the position, on the Z axis, of flying object 10 in this sampling period. On the other hand, position identification unit 102 identifies the positions, on the X axis and the Y axis, of flying object 10 at a frequency smaller than the frequency at which the position on the Z axis is identified. For example, in FIG. 7, there is no change in the shape of the underside of bridge B between beam member B1 and brace member B2 that are located adjacent to each other on the Y axis, and thus position identification unit 102 cannot identify the position, on the Y axis, of flying object 10 in this zone.

As described above, flight control unit 103 controls the flight of flying object 10, based on the positions identified by position identification unit 102. More specifically, flight control unit 103 controls, at the point in time when the position, on the Z axis, of flying object 10 is identified by position identification unit 102, the flight of flying object 10 in the Z axis direction based on this position. For example, flight control unit 103 controls drive apparatuses 1102, and maintains the position in the Z axis direction (altitude) so that flying object 10 flies horizontally in accordance with the flight schedule. Furthermore, flight control unit 103 controls, at a point in time when the position, on the X or Y axis, of flying object 10 is identified by position identification unit 102, the flight of flying object 10 in the axis direction of the corresponding X or Y axis (second coordinate axis) based on this position. For example, flight control unit 103 controls drive apparatuses 1102, and maintains or adjusts the positions in the directions of the X and Y axes so that flying object 10 flies in accordance with the flight schedule. On the other hand, in the period in which neither the position, on the X or Y axis (second coordinate axis), of flying object 10 is identified by position identification unit 102, flight control unit 103 estimates the current position based on the positions, on the X and Y axes, of flying object 10 identified immediately before the start of the period, and the flight speed and the flight direction at this point in time that are estimated based on the driving state of drive apparatuses 1102 of flying object 10, controls the drive apparatuses 1102, and maintains or adjusts the position in the directions of the X and Y axes so that the current position matches the position defined in the flight schedule.

Image capturing apparatus 16 of flying object 10 captures a moving image during the flight of flying object 10, or captures a still image at a predetermined timing. This image data is stored in flying object 10 or server apparatus 20 in association with the position and date of flying object 10 when the image is captured.

According to the above-described embodiment, it is possible to control the position of flying object 10 with respect to a structural object without necessarily providing a marker for position estimation or a transmitter for transmitting a GPS signal in a space where GPS signals are hard to receive.

Modifications

The present invention is not limited to the above-described embodiment. The above-described embodiment may also be modified in the following manner. Furthermore, two or more modifications below may also be executed in combination.

Modification 1

In the example of FIG. 7, since there is a change in the shape of the structural object at the positions at which beam members B1 and brace members B2 are provided, position identification unit 102 identifies the positions, on the X and Y axes, of flying object 10 using sensor 17, but flying object 10 may also fly without identifying the position, on the X axis or the Y axis, of flying object 10 using sensor 17 if, for example, the flight path has a short distance in the X axis or Y axis direction, which does not intersect with the structural object.

Modification 2

Figure 9:
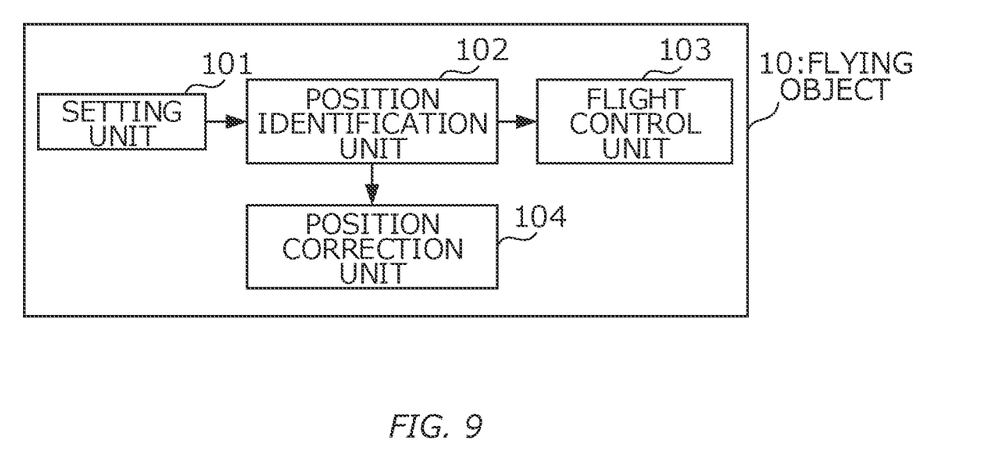
FIG. 9 is a diagram showing an example of the functional configuration of flying object 10 according to a modification, in accordance to the present invention.

In the example of FIG. 7, since there is no change in the shape of bridge B between beam member B1 and brace member B2 that are located adjacent to each other on the Y axis, position identification unit 102 does not identify the position, on the Y axis, of flying object 10 in this zone. As shown in FIG. 9, flying object 10 may also be provided with position correction unit 104 configured to correct, based on the position, on the coordinate axis, of flying object 10 that has been identified by position identification unit 102, a position, on this coordinate axis, of flying object 10 during the period up to the identification of the corresponding position. Specifically, position correction unit 104 may correct a previous flight position, based on the identified positions, on the X and Y axes, of flying object 10, and the flight speed and the history of the flight direction that are estimated based on the driving states of drive apparatuses 1102 of flying object 10 until then. In this case, the position may also be corrected taking into consideration environmental information such as the wind speed at the time of previous flight.

Modification 3

In the example of FIG. 7, since there is no change in the shape of bridge B between beam member B1 and brace member B2 that are located adjacent to each other on the Y axis, position identification unit 102 cannot identify the position, on the Y axis, of flying object 10 in this zone. Flight control unit 103 sets an upper limit for such a period in which the position of flying object 10 cannot be identified (hereinafter, referred to as "position unidentifiable period"), and may perform error processing such as processing for interrupting the flight, if the position unidentifiable period reaches the upper limit. Different position unidentifiable periods may also be set for the respective coordinate axes. An example is such that position unidentifiable period T1 is set for the Y axis, which requires exact position identification, and another position unidentifiable period T2(T1<T2) is provided for the X axis, which does not require as exact position identification as that for the Y axis.

Modification 4

In the present invention, processing performed by flying object 10 on the structural object is not limited to image capture processing, and any type of processing may be performed. Also, the methods for setting the coordinate axes are not limited to the example of the embodiment, and the coordinate space may not necessarily be, for example, an orthogonal coordinate space such as a XYZ coordinate space.

Modification 5

In the present embodiment, flying object 10 functions as a flight control unit, but server apparatus 20 may also function as a flight control unit and control flying object 10.

Modification 6

In the present embodiment, position identification unit 102 may exceptionally identify the position, on the Z axis, of flying object 10 based on the distance to the water surface of a river, but, in addition thereto, if the shape of a structural object is unique depending on the position thereof for example, position identification unit 102 may also identify the position of flying object 10 with respect to a structural object based on a result obtained by flying object 10 capturing an image of the structural object and performing image recognition.

Modification 7

If a structural object is a tunnel for example, and the longitudinal direction of the tunnel is set as the Y axis direction, the horizontal direction orthogonal to the Y axis is set as the X axis direction, and the vertical direction is set as the Z axis direction, sensor 17 may also be provided that is configured to measure the distance to a structural object (lateral side of the inner wall of the tunnel) that is located in the X axis direction when viewed from the flying object 10, and the distance to a structural object (ceiling surface of the inner wall of the tunnel) that is located in the Z axis direction when viewed from the flying object 10. In this case, the inner wall surface of the tunnel has a shape such that there is some form of change in at least one of the X, Y, and Z axes, similar to the bridge of the embodiment. For example, position identification unit 102 identifies the position on the Z axis based on the distance to the structural object (ceiling surface of the inner wall of the tunnel) located in the Z axis direction, and/or the distance to the structural object (lateral side of the inner wall of the tunnel) located in the X axis direction, and identifies the positions on the X and Y axes based on the distance to the structural object (ceiling surface of the inner wall of the tunnel) located in the Z axis direction, and/or the distance to the structural object (lateral side of the inner wall of the tunnel) located on the X axis direction. Accordingly, position identification unit 102 may also identify the position of flying object 10 based on a plurality of distances from flying object 10 to the structural objects.

Other Modifications

The block diagrams used for description of the above-described embodiment show blocks of the functional units. These functional blocks (configuration units) are realized by a suitable combination of hardware and/or software. Furthermore, means for realizing the functional blocks is not particularly limited. That is, each functional block may be realized by a single unit that is physically and/or logically put together, or by two or more units that are separated physically and/or logically from each other, and are connected to each other directly and/or indirectly (for example, in a wired manner and/or wireless manner).

Furthermore, at least some of the functions of server apparatus 20 may be implemented on flying object 10. Similarly, at least some of the functions of flying object 10 may be implemented on server apparatus 20.

The aspects/embodiments described in the present specification may be applicable to a system that employs an appropriate system such as Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark), and/or to a next-generation system that is expanded based thereon.

The order of steps of the processing procedure, sequence, flowchart, and the like of the aspects/embodiments described in the present specification may be changed as long as there is no contradiction. For example, the method described in the present specification presents various step elements in an exemplified order, and is not limited to the presented specific order.

The aspects/embodiments described in the present specification may be used alone or in combination, or may be used by being switched at the time of execution. Also, notification of predetermined information (for example, notification of "the fact that it is X") is not limited to explicitly-executed notification, and may also include implicitly-executed notification (for example, notification of predetermined information is not executed).

The terms "system" and "network" that are used in the present specification can be used compatibly.

The information, parameters, and the like described in the present specification may be expressed in absolute values, or may be expressed in relative values from a predetermined value, or may be expressed by other corresponding types of information. For example, a radio resource may also be a resource instructed by an index.

The names used for the above-described parameters are not limiting in any respect. Furthermore, mathematical formulae that use these parameters, and the like may be different from those disclosed explicitly in the present specification. Various channels (such as PUCCH or PDCCH, for example) and information elements (such as TPC, for example) can be identified by any appropriate names, and thus various names assigned to the various channels and information elements are not limitative in any respect.

The term "determining" used in the present specification may encompass various types of operations. The term "determining" may include, for example, judging, calculating, computing, processing, deriving, investigating, looking up (e.g., looking up a table, database, or another data structure), and ascertaining, which are regarded as "determining". Also, the term "determining" may also include, for example, receiving (e.g., receiving information), transmitting (e.g., transmitting information), inputting, outputting, and accessing (e.g., accessing data stored in a memory), which are regarded as "determining". Furthermore, the term "determining" may also include, for example, resolving, selecting, choosing, establishing, comparing, and the like, which are regarded as "determining". In other words, the term "determining" may include, for example, any operation that is regarded as "determining".

The present invention may be provided as a flight control method or information processing method that includes a processing step that is executed by flight control system 1 or server apparatus 20. The present invention may also be provided as a program that is executed by flying object 10 or server apparatus 20. Such a program may be provided in an aspect in which it is recorded in a recording medium such as an optical disc, or in an aspect in which it is downloaded, via a network such as the Internet, onto a computer and is installed so as to be available.

Software, an instruction, and the like may also be transmitted/received via a transmission medium. For example, if software is transmitted from a web site, a server, or another remote source, using wired technology such as a coaxial cable, an optical fiber cable, a twist pair, and a digital subscriber line (DSL), and/or wireless technology such as infrared light, a radio wave, and a microwave, the wired technology and/or the wireless technology will be included in the definition of the transmission medium.

Information, signals, and the like described in the present specification may also be expressed using any of various different technologies. For example, data, an instruction, a command, information, a signal, a bit, a symbol, a chip, and the like that may have been mentioned throughout the description above may also be expressed by an electric voltage, an electric current, an electromagnetic wave, a magnetic field or a magnetic particle, an optical field or a photon, or an arbitrary combination thereof.

The terms described in the present specification and/or the terms needed for understanding the present specification may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

Any reference to the elements using nominal signs such as "first" and "second" used in the present specification does not limit, in general, the amount or order thereof. These nominal signs can be used in the present specification as a convenient method for distinguishing between two or more elements. Accordingly, reference to first and second elements does not mean that only two elements can be used here, or that the first element should precede the second element somehow.

The "means" used for the configuration of each of the above-described apparatuses may be replaced by a "unit", "circuit", "device", or the like.

The terms "including", "comprising", and any form thereof are intended to be comprehensive as long as they are used in the present specification or the claims, similar to the term "being provided with". Furthermore, the term "or" used in the present specification or the claims is intended not to be exclusive OR.

In the entirety of the present disclosure, when articles, such as "a", "an", and "the" in English for example, are added through translation, these articles also denote the plural form unless it is clear otherwise from the context.

While the present invention has been described in detail, it would be obvious to those skilled in the art that the present invention is not limited to the embodiment explained in the present specification. The present invention can be implemented as corrected and modified aspects without departing from the spirit and scope of the present invention that are defined by the description of the claims. Accordingly, the present specification aims to illustrate examples and is not intended to restrict the present invention in any way.

REFERENCE SIGNS LIST

1 Flight control system
10 Flying object
20 Server apparatus
11 Processor
12 Memory
13 Storage
14 Communication apparatus

What is claimed is:

1. A flying object control apparatus comprising:
a processor configured to:
set a plurality of coordinate axes, the plurality of coordinate axes serving as a reference for identifying a position of a flying object, in a flight space that includes a space in which accuracy of positioning based on a radio signal transmitted from a satellite is equal to or smaller than a threshold;
identify the position of the flying object in the space, using different methods for the plurality of coordinate axes; and
control flight of the flying object based on the position identified by the processor;
wherein the plurality of coordinate axes includes a first coordinate axis that intersects with a structural object, and a second coordinate axis that does not intersect with the structural object; and
the processor is further configured to continuously identify a position on the first coordinate axis of the flying object, whereas the processor identifies a position on the second coordinate axis of the flying object at a frequency smaller than a frequency at which the position on the first coordinate axis is identified, or does not identify the position on the second coordinate axis of the flying object.

2. The flying object control apparatus according to claim 1,
wherein the processor controls, at a point in time when at least one position, on the second coordinate axis, of the flying object is identified by the processor, flight of the flying object in an axis direction of the second coordinate axis based on the at least one position, whereas
the processor controls, in a period in which no position, on the second coordinate axis, of the flying object is identified by the processor, flight of the flying object in the axis direction of the second coordinate axis based on a position of the at least one position, on the second coordinate axis, of the flying object identified immediately before the start of the period.

3. The flying object control apparatus according to claim 1,
wherein the processor identifies the position, on the first coordinate axis, of the flying object based on a distance from the flying object to the structural object.

4. The flying object control apparatus according to claim 1,
wherein the processor identifies the position, on the second coordinate axis, of the flying object based on a change in a shape of the structural object in an axis direction of the second coordinate axis.

5. The flying object control apparatus according to claim 1, wherein the processor is further configured to:
correct, based on a position, on a coordinate axis of the plurality of coordinate axes, of the flying object that is identified by the processor, another position, on the coordinate axis, of the flying object that has been identified during a period up to the identification of the position.

6. The flying object control apparatus according to claim 2, wherein an upper limit set for the period in which the processor controls flight of the flying object based on the position identified immediately before the start of the period differs between the plurality of coordinate axes.

* * * * *